(12) United States Patent
Fryer

(10) Patent No.: US 6,776,701 B2
(45) Date of Patent: Aug. 17, 2004

(54) METHOD AND APPARATUS FOR HEAD REMOVAL

(75) Inventor: Frank D. Fryer, Lyle, MN (US)

(73) Assignee: Hormel Foods, LLC, Austin, MN (US)

( * ) Notice: Subject to any disclaimer, the term of this patent is extended or adjusted under 35 U.S.C. 154(b) by 0 days.

(21) Appl. No.: 10/314,779

(22) Filed: Dec. 9, 2002

(65) Prior Publication Data

US 2004/0110457 A1 Jun. 10, 2004

(51) Int. Cl.[7] ............................................. A22B 3/10
(52) U.S. Cl. ...................................................... 452/64
(58) Field of Search .......................... 452/64, 166, 167, 452/168

(56) References Cited

U.S. PATENT DOCUMENTS

| | | | |
|---|---|---|---|
| 2,632,200 A | | 3/1953 | Fortner et al. .................. 17/12 |
| 2,836,845 A | * | 6/1958 | Farchmin et al. ........... 452/166 |
| 2,854,690 A | * | 10/1958 | O'Donnell .................. 452/168 |
| 2,926,383 A | * | 3/1960 | Steck |
| 2,993,228 A | * | 7/1961 | Zebarth ...................... 452/167 |
| 2,994,908 A | | 8/1961 | Fill ................................. 17/1 |
| 3,017,660 A | | 1/1962 | Reeves ........................... 17/12 |
| 3,056,161 A | | 10/1962 | Zebarth .......................... 17/11 |
| 3,201,823 A | * | 8/1965 | Methews ..................... 452/167 |
| 3,990,126 A | | 11/1976 | Ochylski ...................... 17/1 R |
| 4,092,762 A | | 6/1978 | Ochylski ........................ 17/45 |
| 4,158,903 A | | 6/1979 | Ochylski ...................... 17/1 R |
| 4,558,489 A | | 12/1985 | van Mil ......................... 17/52 |
| 5,035,673 A | | 7/1991 | Hazenbroek ................ 452/149 |
| 5,083,971 A | | 1/1992 | Karubian et al. ............. 452/64 |
| 5,104,350 A | | 4/1992 | Morlack et al. .............. 452/64 |
| 5,188,560 A | | 2/1993 | Hazenbroek ................ 452/169 |
| 5,195,923 A | * | 3/1993 | Rankin et al. ................ 452/64 |
| 5,405,287 A | * | 4/1995 | Allain ........................... 452/4 |
| 5,507,688 A | * | 4/1996 | Van Ochten ................ 452/64 |
| 6,475,076 B1 | * | 11/2002 | Rheingans et al. ......... 452/167 |

* cited by examiner

Primary Examiner—Thomas Price
(74) Attorney, Agent, or Firm—IPLM Group, P.A.

(57) ABSTRACT

A head removal apparatus (10) includes a pivoting saw assembly (30). A first end of the pivot assembly (30) is connected to the frame (11) and a second end is free to move up and down downstream from the first end. A saw (68) is operatively connected to the second. A guide, proximate the first end, is provided whereby the connecting strip between the head and the carcass is guided toward the saw, whereby the head travels downstream under the pivot arm and raises the pivot arm. The pivot arm raises the saw to the proper cutting height.

12 Claims, 12 Drawing Sheets

METHOD AND APPARATUS FOR HEAD REMOVAL

BACKGROUND OF THE INVENTION

1. Field of the Invention

This invention relates generally to the removal of a head from an animal carcass and more particularly to the removal of the head of a carcass as the carcass is carried by and suspended from an overhead conveyor system.

2. Description of the Prior Art

In the commercial meat packing operations, animals, such as hogs, are slaughtered, bled, head removed, skinned, eviscerated and the carcass is then cut into halves before it is chilled. The carcasses are suspended from an overhead rail and are moved by conveyor on the rail. During one portion of this overall operation, the head of the animal has been severed and it is attached by a layer of skin that connects the carcass to the head. On this layer of skin is some meat. Therefore, during the process where the head is completely severed from the carcass, it is preferred to sever the head as close to the head so as to allow as much meat as possible to remain with the carcass.

However, one problem with the automated process of removing the head is that the height of the head varies considerably depending upon the size of the hog, the variability of thickness and orientation. The layer of skin and meat, left attached to the head, is referred to in the industry as a strap. The automation of such a process has been difficult and the final removal of the head is usually done by hand.

Because the height of the head varies between hogs, if you cut in the same place on every hog, too much meat is wasted. If the cut is too close to the head, there will be a problem of bone chips and possibly dulling the cutter. Automated systems, using either visioning systems, ultrasonics and photoelectric eyes require a considerable amount of maintenance in wet environments and is therefore not a good solution.

The present invention addresses the problems associated with the prior art and provides for an apparatus which accommodates hogs having head heights which vary and uses guides to adjust the height of the cutter as the hog is being moved on an overhead conveyor.

SUMMARY OF THE INVENTION

In one embodiment, the invention is an apparatus for the removal of a head from an animal carcass as it is being moved on an overhead conveyor system. The carcass is suspended with the head down and the head is connected to the carcass by a connecting strip. The apparatus includes a support frame. A pivot arm has a first end pivotally connected to the frame and a second end. The second end is downstream from the first end. A saw is operatively connected to the second end. A motor is operatively connected to the saw for activating the saw. A guide is operatively connected to the apparatus proximate the first end of the arm, whereby the connecting strip and head are guided toward the saw, wherein as the head travels downstream under the pivot arm and raises the pivot arm, the pivot arm raises the saw to the proper cutting height.

In another embodiment, the invention is a method of removing a head from an animal carcass. The animal carcass is suspended with the head down and the head connected to the carcass by a connecting strip. The carcass is moved to a head removal apparatus. The head contacts an underneath surface of a pivot arm at a first position, the pivot arm having a movable end, the moveable end having a saw operatively connected thereto. The carcass is continued to be moved downstream. The movable end is moved upward, by the movement of the head, thereby adjusting the saw to a proper height to cut the connecting strip and remove the head from the carcass.

DETAILED DESCRIPTION OF A PREFERRED EMBODIMENT

Figure 1:
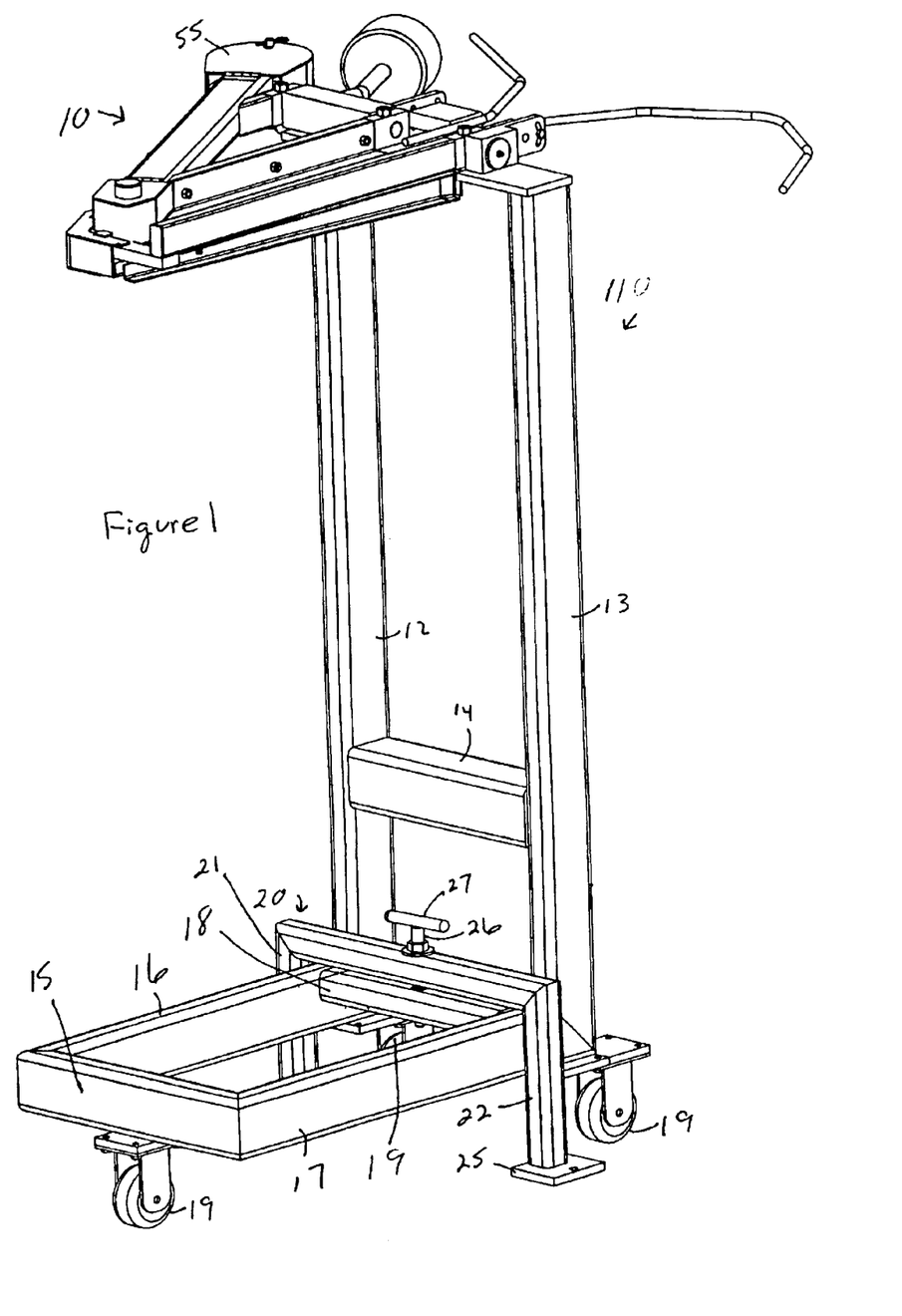
FIG. 1 is a perspective view of the head removal apparatus of the present invention.
Figure 2:
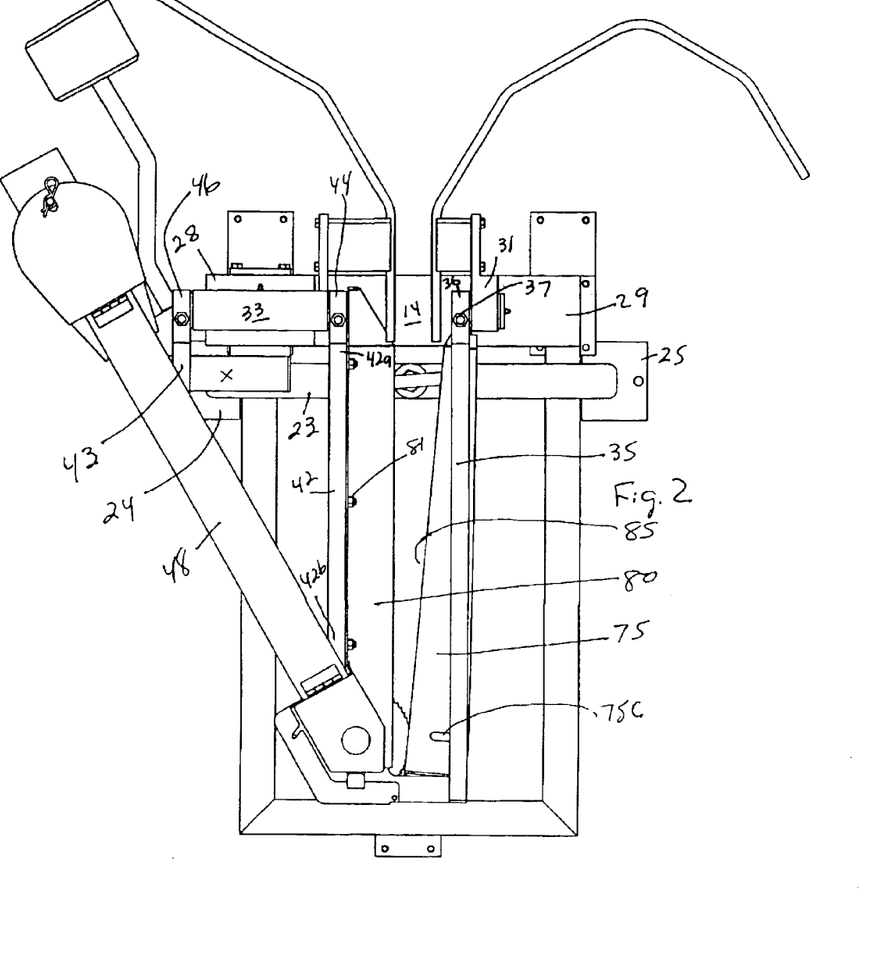
FIG. 2 is a top plan view of the apparatus shown in FIG. 1.

Referring to the drawings, wherein like numerals represent like parts throughout the several views, there is generally disclosed at 10 a head removal apparatus. The apparatus 10 includes a frame, generally designated at 11. The frame 11 includes a pair of upright members 12, 13 by a cross member 14. A rectangular portion is formed by four members 15–18, operatively connected by suitable means such as welding. The upright members 12, 13 are operatively connected to the members 16, 17 by suitable means such as welding. Three wheels 19 are operatively connected to the frame thereby providing for a frame that may be wheeled. The frame 11 is secured in position by a clamping member 20. The clamping member 20 is in a general shape of an inverted "U" and is sized to receive the rectangular portion of the frame 11. The clamping member 20 has two legs 21, 22 connected by a cross member 23. Plates 24, 25 are operatively connected to the legs 21, 22 respectively by suitable means such as welding. The plates 24, 25 have openings through which bolts may be inserted to secure the plates to the production floor. An engaging threaded rod 26 has a T-handle 27 at one end 26a and the second end 26b of rod 26 extends through the cross member 23 into a threaded slot in cross member 18. The rod 26 is moved up and down by rotation of the T-handle 27. The bottom 26b of the rod 26 engages the cross member 18 and secures the frame 11 in position. By utilizing such a method of securing the frame to the production floor, the head removal apparatus 10 may be wheeled in and out for service or maintenance easily. However, it is understood that any suitable frame or mounting members may be utilized for the head removal apparatus 10.

Mounting plates 28, 29 are operatively connected to the top of the upright members 12, 13 by suitable means such as welding. The plates 28, 29 have a plurality of holes 28a, 29a formed therein for mounting the pivoting saw assembly 30. A first pivot arm clevis plate 31 is secured to the mounting plate 29 by two bolts 32. The plate 31 has a bore 31a that extends through the plate. The plate 31 includes a guide arm mounting section 31b that will be described in more detail hereafter. A second pivot arm clevis plate 33 is mounted to the mounting plate 28 by four bolts 34, only three of which are shown.

Figure 8:
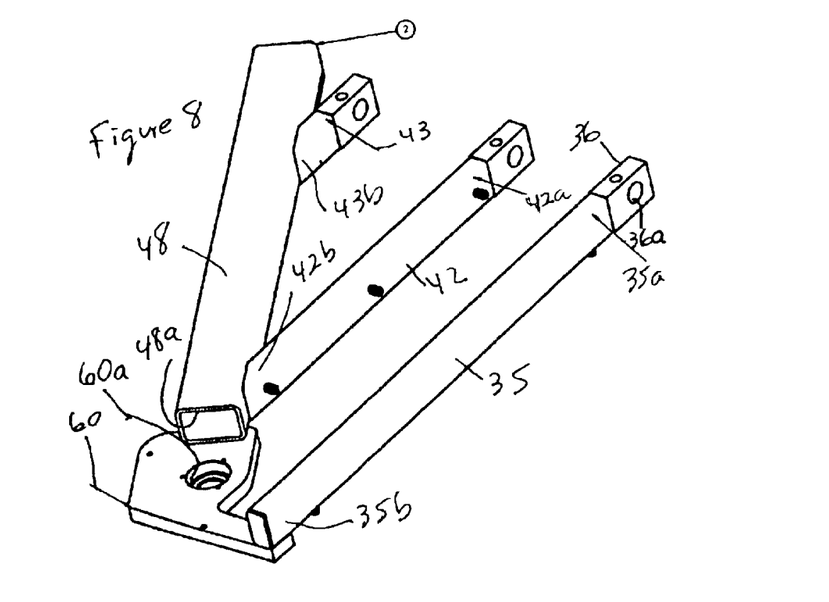
FIG. 8 is a perspective view of a portion of the apparatus shown in FIG. 1.

Referring now to FIG. 8, the weldment for the pivoting saw assembly 30 is shown. The weldment includes a first pivot arm 35 welded at its second end 35b to a saw mounting plate 60. A second pivot arm 42 has its second end 42b welded to a channel 48 that is generally rectangular and has a bore 48a extending therethrough. A third pivot arm 43 has its second end 43b welded to the channel 48. The saw mounting plate 60 has a generally circular opening 60a extending therethrough.

The first pivot arm 35 has a first end 35a and a second end 35b. A nose piece 36 is welded to the first end 35a. The nose piece 36 has a circular opening 36a which is in alignment with the bore 35c which extends through the first end 35a. The first end 35a is pivotally mounted to the clevis plate 31 by a bushing 38, two washers 39 and a pivot rod 40. A grease fitting 41 is provided to allow for a lubricant to be used. The second pivot arm 42 has a first end 42a and a second end 42b. The third pivot arm 43 has a first end 43a and a second end 43b. The pivot arms 42, 43 are pivotally mounted on the second pivot arm clevis plate 33. A nose piece 44 is welded to the first end 42a of the second pivot arm 42. A nose piece 46 is welded to the first end 43a of the third pivot arm 43. The nose piece 44 has an opening 44a. The nose piece 46 also has a similar opening (not shown). The nose pieces 44, 46 and therefore the pivot arms 42, 43 are pivotally mounted to the second pivot arm clevis plate 43 by a similar arrangement of bushings, washers and rods as shown with respect to the first pivot arm 31. Such a pivoting connection is not shown but is similar to that previously described with respect to the other pivot arm 35. Bolts 37, 45 and 47 have an arcuate portion (not shown) which is positioned around rod 40 and the rod (not shown) which is positioned in opening 44a. Then, when the bolts are tightened, they hold the rods in position, as is well known in the art.

A channel 48 is operatively connected, by suitable means such as welding, to the second ends 42b, 43b of the pivot arms 42, 43. The channel 48 has a longitudinal bore 48a in which a timing belt 49 is mounted, as will be described more fully hereafter.

Figure 7:
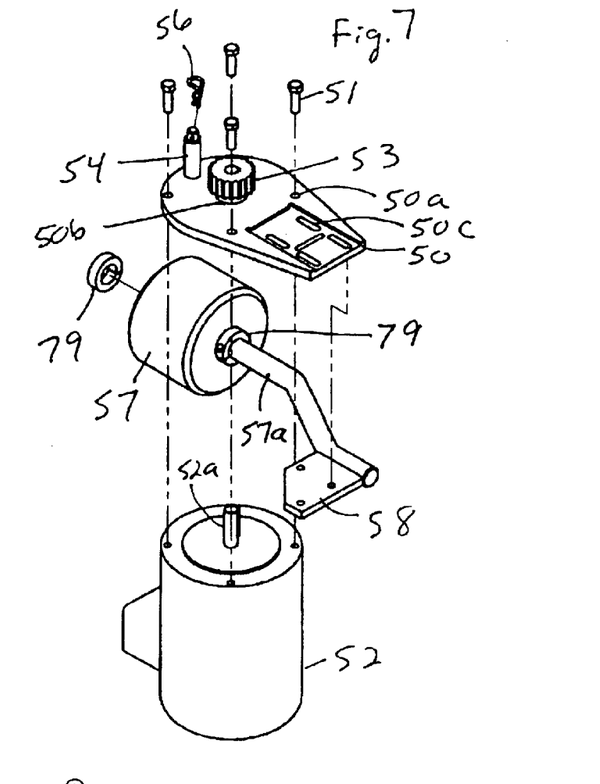
FIG. 7 is an exploded perspective view of a portion of the apparatus shown in FIG. 4.

Referring now to FIG. 7, the motor mount 50 has four openings 50a through which four bolts 51 are positioned to secure the motor 52 to the motor mount 50. The motor mount 50 has a central opening through which the drive shaft 52a of the motor 52 extends. The drive shaft 52a is operatively connected to the drive wheel 53. A guard housing 55 is positioned around the motor mount 50 and is hinged and is held in place by a hairpin key 56 which connects to a stand-off 54. The stand-off 54 is operatively connected to the motor mount 50. A counterweight 57 slides on shaft 57a which is welded to plate 58. Collars 79 hold the counterweight 57 in position, that may be varied along the shaft 57a. The mounting plate 58 is secured to the motor mount 50 and channel 48 by suitable means, such as bolts 78, shown in FIG. 3A. The mounting plate 50 is movably mounted to the channel 48. As best can be seen in FIG. 7, the mounting plate 50 has an indentation in the general shape of a rectangle and four slots 50c are formed therein. The indentation is sized to receive the channel 48. Four holes (not shown) are formed in the bottom wall 48b of the channel 48. Suitable means, such as nuts and bolts, are then used to secure the bottom wall 48b to the motor mount 50 through the slots 50c. The motor mount may be moved longitudinally, with respect to the channel 48, to provide for tensioning for the timing belt 49.

Figure 4:
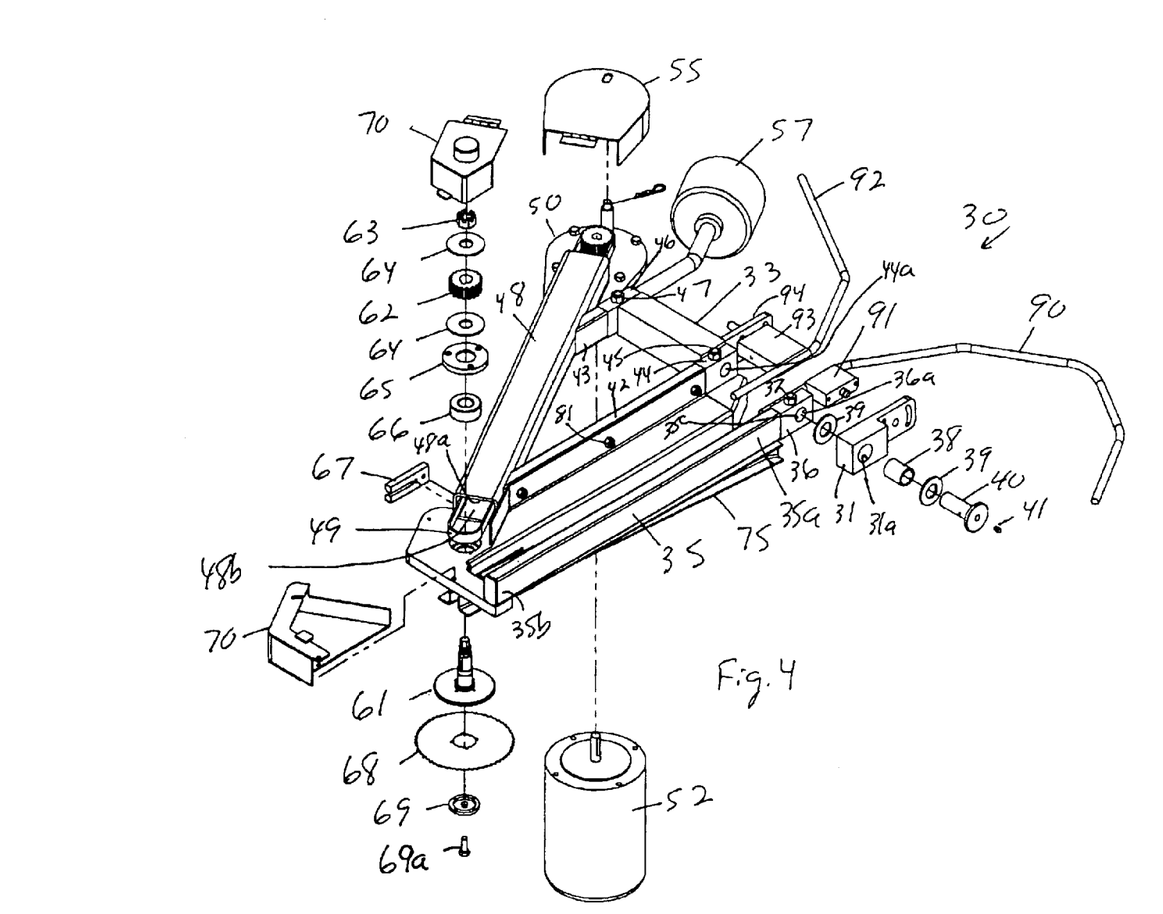
FIG. 4 is an exploded perspective view of a portion of the apparatus shown in FIG. 1.
Figure 5:
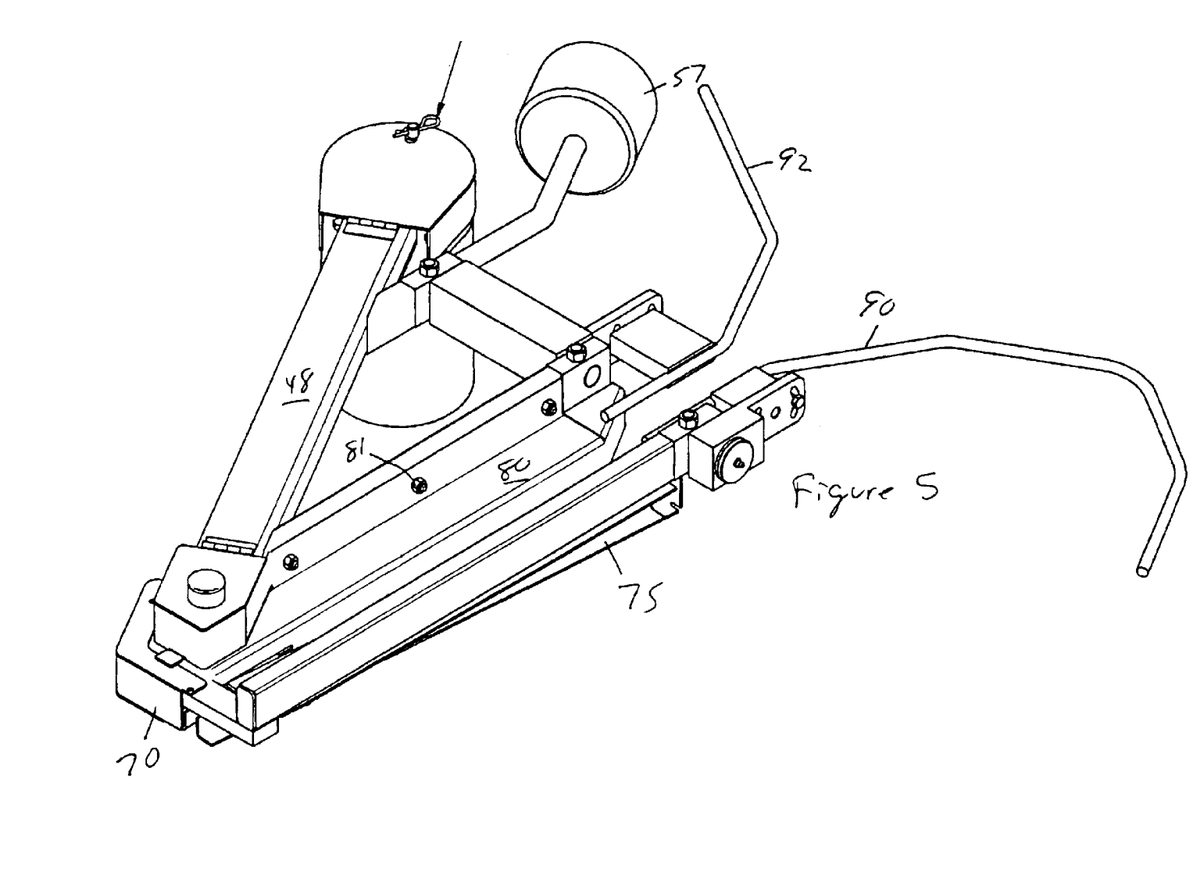
FIG. 5 is a perspective view of the portion of the apparatus shown in FIG. 4.

Referring now to FIG. 4, a blade spindle 61 is mounted in the opening 60a. The blade spindle 61 has mounted thereto a timing pulley 62. Using construction, well known in the art, a nut 63 and timing belt spacer 64 are positioned on top of the timing pulley 64 and another spacer 64, bearing cover 65 and bearing 66 are underneath the timing pulley 62. A blade wash manifold 67 is suitably mounted to the channel 48 to hold appropriate hoses for providing water to wash the blade 68 between cuts. The blade 68 is secured to the spindle 61 by a spindle cap 69 and bolt 69a. A blade cover 70 is suitably mounted to the saw mounting plate 60 to provide for appropriate protection, although it is understood that other suitable guarding covers may also be utilized. The motor 52 thereby drives the circular saw blade 68 through the timing belt 49. Suitable controls, well known in the art, control the activation of the motor 52. The motor has a magnetic starter and two start/stop buttons, all not shown as they are well known in the art. The motor 52 is typically left on during operation and is not cycled for each hog.

A first plate 75 is secured to the first pivot arm 35 and a second plate assembly is secured to the second pivot arm 42. The two plates 75, 80 provide for a tapered slot 85 which decreases in width as the slot approaches the blade 68. The plates 75, 80 are shown in more detail in FIGS. 12–15. The plate 80 has a first portion 80a in which three holes 80b are formed. The holes 80b are used to secure the plate 80 to the arm 42 by suitable bolts and nuts 81. A second portion 80c is generally vertical and forms a portion of the slot 85. A slotted opening 80d is formed in the plate 80 and provides for a space in which the blade 68 is positioned.

Figure 12:
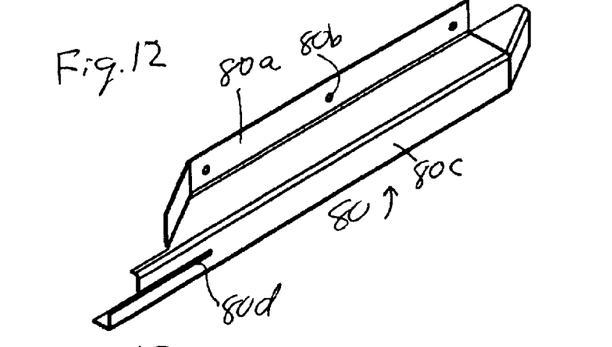
FIG. 12 is a perspective view of a plate shown in FIG. 2.
Figure 13:
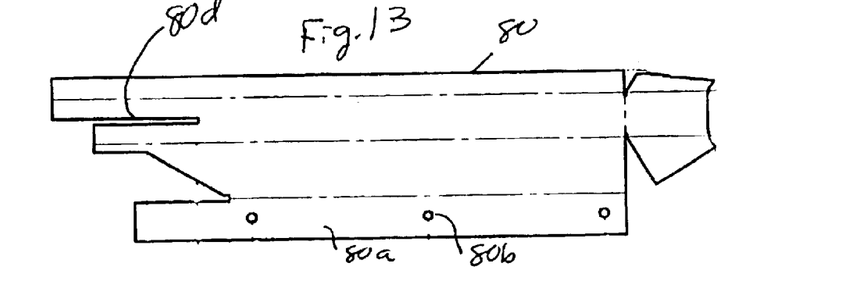
FIG. 13 is a top plan view of the plate shown in FIG. 12 before being bent.
Figure 14:
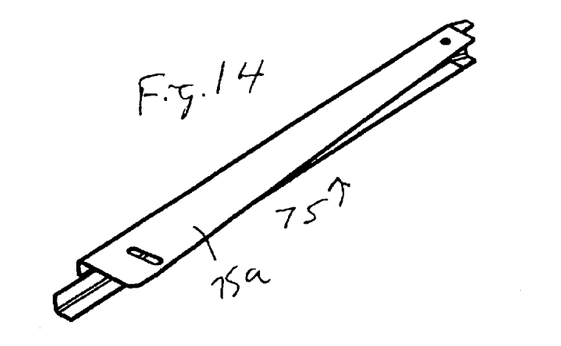
FIG. 14 is a perspective view of another plate shown in FIG. 2.
Figure 15:
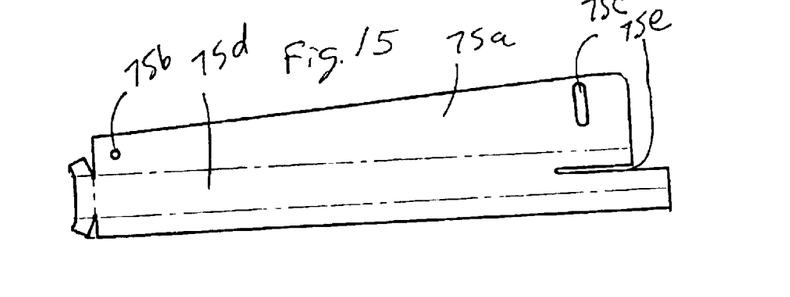
FIG. 15 is a top plan view of the sheet shown in FIG. 14, before it is bent.

The plate 75 has a first portion 75a in which a hole 75b and a slot 75c are formed. The plate 75 is connected to an underneath side of the arm 35 by bolts (not shown) through holes 75b and slot 75c. The slot 75c provides for an adjustment of the slot 85 formed between the two plates 75, 80. The plate 75 will pivot about the holes 75b at one end and the bolt is fastened in the slot 75c to create the desired gap formed in the slot 85. The plate 75 has a second portion 75d that is also vertical, and along with second portion 80c forms the slot 85. Another slot 75e is formed in the plate 75 and provides for a clearance in which the blade 68 is positioned.

Figure 3A:
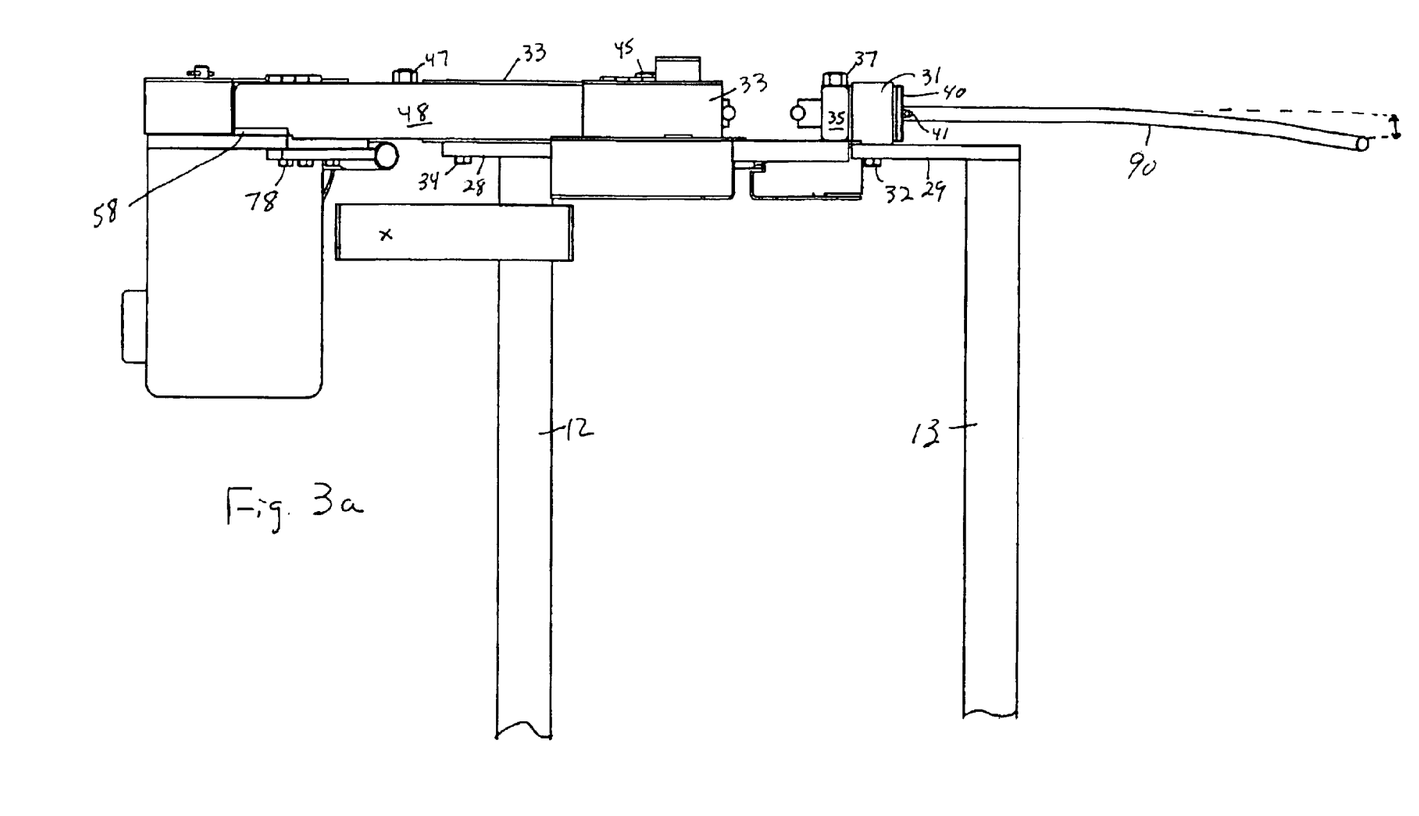
FIG. 3a is a right side elevational view of the top portion of the apparatus shown in FIG. 1.
Figure 3B:
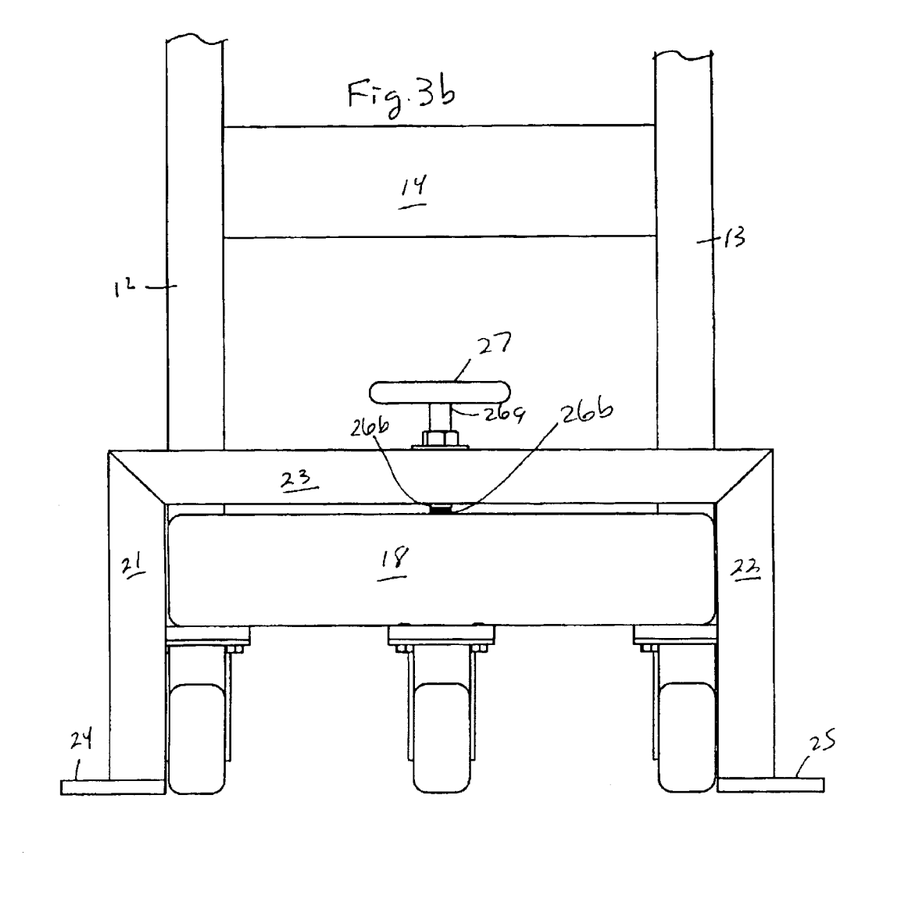
FIG. 3b is a right side elevational view of the bottom portion of the apparatus shown in FIG. 1.

A first guide bar 90 is connected to a block 91, which is in turn mounted to the guide arm mounting section 31b. The guide bar 90 extends generally downstream and outwards to the right, when viewed in FIG. 4. Further, as can be seen in FIG. 3a, the guide bar 90 extends generally downward approximately 3 inches. A second guide bar 92 is mounted to a mounting block 93 which is similarly mounted to a guide arm mounting section 94. The guide arm mounting section 94 is operatively connected to the second pivot arm clevis plate 33. The guide arm 92 extends generally downstream and outward, to the left, as viewed in FIG. 4. The two guide arms 90, 92 form a generally V-shaped slot for guiding the hog carcass into the slot 85. Further, the guide arm 90 extends generally downward, to properly position the front feet, as will be described more fully hereafter.

Figure 6:
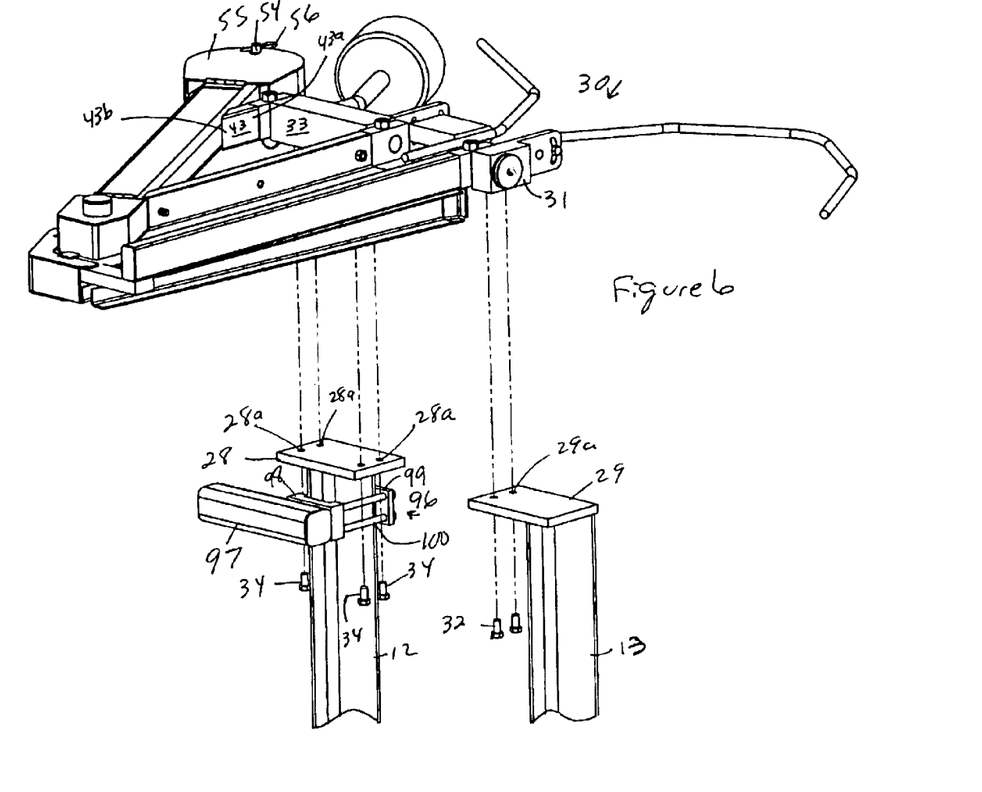
FIG. 6 is an exploded perspective view of a portion of the apparatus shown in FIG. 1.

Referring to FIG. 6, a stop assembly, generally designated at 96, is shown operatively connected to the upright 12. The stop assembly 96 prevents the pivoting saw assembly 30 from pivoting too far downward. The stop assembly 96 includes a generally rectangular bar 97 secured to a first plate 98. A second plate 99 is also utilized. The plates 98, 99 have openings through which bolts 100 are positioned. The bolts 100 may then be tightened to secure the plates 98, 99, and therefore the bar 97 in a set position along the upright 12. If the bolts 100 are loosened, the stop assembly may be slid up or down and then secured in position. The further down the upright 12 that the stop assembly is positioned, the further down the pivoting saw assembly 30 may rotate.

Figure 9:
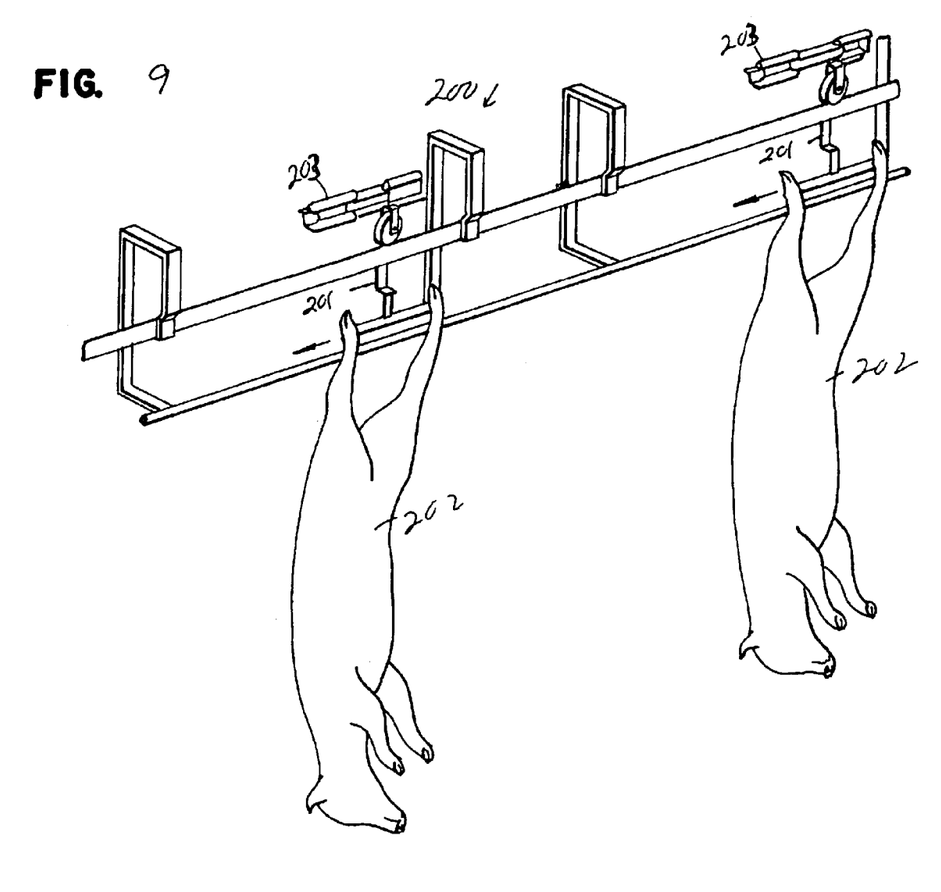
FIG. 9 is a perspective view of a typical overhead conveyor system used with the apparatus shown in FIG. 1.
Figure 10:
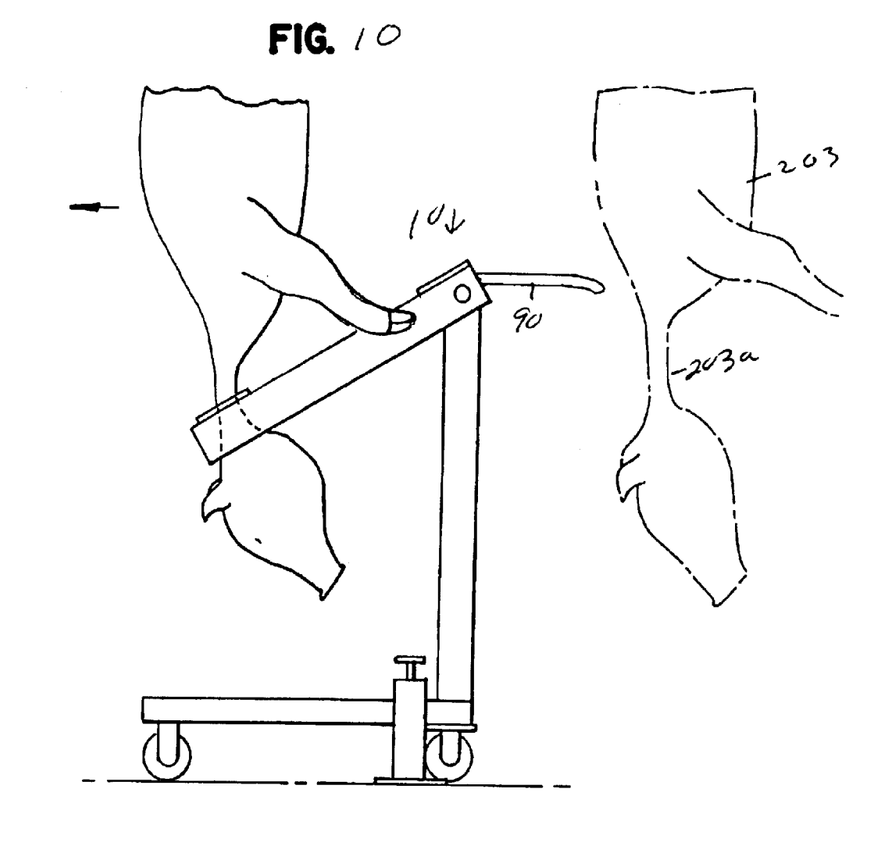
FIG. 10 is a schematic representation showing a method of using the apparatus shown in FIG. 1.
Figure 11:
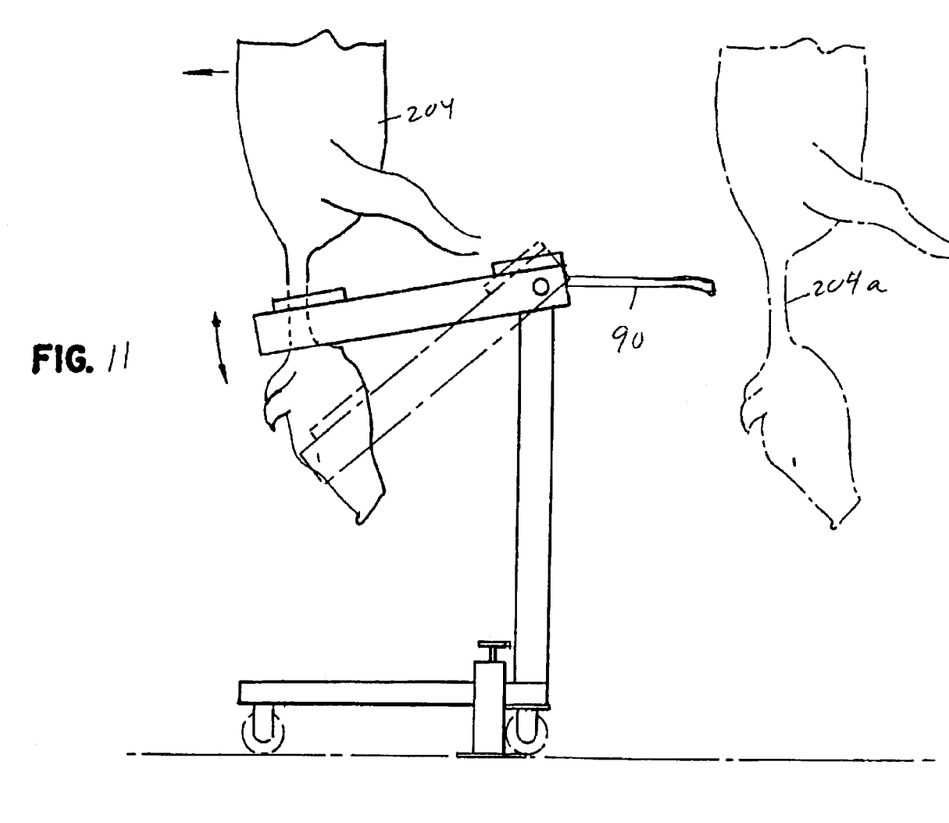
FIG. 11 is another schematic representation of a method of using the apparatus shown in FIG. 1.

A typical overhead conveying system 200 is generally shown in FIG. 9. It is understood that any suitable conveying system may be utilized. The conveying system 200 includes movable trolleys 201 on which the hog carcasses 202 are suspended by their hind feet. The hog carcasses are thereby moved from station to station on the trolleys 201 by moveable chain 203 on the overhead conveying system 200. The hogs 202, as shown in FIG. 9, have had the necks partially severed. This is well known and is not shown. After the head has been dropped, there is a layer of skin (strap) that holds the head on to the rest of the carcass. This layer of skin has some meat associated with it, and therefore it is preferable to sever the head from the carcass such that as much meat remains with the carcass as possible. One of the problems in doing so is that the height of the head, with respect to the ground, will vary depending upon the size or length of the hog. Therefore, it is necessary to adjust the height of the saw blade, relative to the ground, to provide for the optimum cut. As can be seen in comparing FIGS. 10 and 11, the hog 203, in FIG. 10, is closer to the ground than hog 204, in FIG. 11. The hogs that are shown in phantom in FIGS. 10 and 11 are downstream and the hogs shown in solid are after the hogs have continued the movement further upstream, through the head removal apparatus 10. The operation of the head removal apparatus 10 is the same in FIGS. 10 and 11, independent upon the size of the hog, until the hog reaches the pivot saw assembly 30. Prior to that, the hog carcasses move along the overhead conveyor system and approaches the head removal apparatus 10. The hog may be swaying and the back of the hog contacts the second guide arm 92 and stops the hog from swinging. The second guide arm 92 guides the connecting strip 203a, 204a toward the tapered slot 85. Similarly, the first guide arm 90 will also guide the strip 203a, 204a to the tapered slot 85. In addition, the guide arm 90 will prevent the feet of the hog from entering into the slot 85.

Referring now to FIG. 10, it can be seen that as the hog 203 enters the head removal apparatus 10, the hog 203 represents the shortest distance from the floor. As such, the underneath portion of the hog head will only contact the underneath portion of the pivot arm assembly 30 just as the connecting strip 203a contacts the circular saw blade 68. This is in contrast to the hog 204, represented in FIG. 1, which is a greater distance from the floor. The head of the hog 204 will contact the underneath side of the pivot arm assembly 30 and continue upstream to the position shown in solid line in FIG. 11. It thereby pivots the pivot arm assembly upward, thereby bringing the saw blade 68 to the proper height so as to cut the strip 204a as close to the head of the hog as practical, thereby leaving the maximum amount of meat on the carcass. Preferably, the tapered slot 85 tapers down to a gap of between ¾ to 1 inch at the saw blade 68. The counterweight 57 provides for a counterbalance so that the head of the hog does not have to lift as much weight as it pivots the pivoting saw assembly 30. Further, the motor is mounted in a position behind the axis on which the pivoting saw assembly 30 pivots, thereby also acting as a counterweight.

The above specification, examples and data provide a complete description of the manufacture and use of the composition of the invention. Since many embodiments of the invention can be made without departing from the spirit and scope of the invention, the invention resides in the claims hereinafter appended.

I claim:

1. An apparatus for the removal of a head from animal carcass as it is being moved on an overhead conveyor system, the carcass being suspended with the head down and the head connected to the carcass by a connecting strip, the apparatus comprising:

a) a support frame;
   b) a pivot arm having a first end pivotally connected to the frame and a second end, the second end downstream from the first end the second end fee to move in a vertical direction, the pivot arm having an underneath surface operatively connected thereto;
   c) a saw operatively connected to the second end, the saw is moveable in a vertical direction in response to pivoting of the pivot arm;
   d) a motor operatively connected to the saw for activating the saws; and
   e) a guide operatively connected to the apparatus proximate the first end of the arm,
   whereby the connecting strip and head are guided toward the saw, wherein as the head travels downstream under the pivot arm, the head contacts the underneath surface and raises the pivot arm, the pivot arm raises the saw to a proper cutting height.

2. The apparatus of claim 1, further comprising the saw being a circular saw.

3. The apparatus of claim 1, wherein the guide is connected to the pivot arm.

4. The apparatus of claim 3, wherein the pivot arm comprises a first arm and a second arm, the pivot arm forming a gap therebetween.

5. The apparatus of claim 4, wherein the guide comprising a first guide operatively connected to the first arm and a second guide operatively connected to the second arm.

6. The apparatus of clam 5, further comprising the apparatus has a front side and a back side, the first arm proximate the back side and the second arm proximate the front side, the first guide extending upstream from the first arm and extending toward the back side, wherein the carcass is stabilized as it enters the apparatus.

7. The apparatus of claim 6, further comprising the second guide extending upstream from the second arm and extending generally toward the front side and also extending downward, wherein legs of the carcass pass over the second guide and away from the gap between the pivot arms.

8. The apparatus of claim 1, further comprising the motor operatively connected to the pivot arm longitudinally proximate the first end of the pivot arm, wherein the motor acts as a counterweight to allow for easier pivoting of the pivot arm.

9. The apparatus of claim 8, further comprising a supplemental counterweight operatively connected to the pivot arm.

10. The apparatus of claim 4, wherein the gap formed by the pivot arms narrows going from the first end to the second end.

11. The apparatus of claim 10, wherein the gap is between ¾ inch to 1 inch at the saw.

12. A method of removing a head from an animal carcass, comprising:

a) suspending an animal carcass with the head down and the head connected to the carcass by a connecting strip;

b) moving the carcass to a head removal apparatus;

c) contacting, with the head, an underneath surface of a pivot arm at a first position, the pivot arm having a moveable end, the moveable end having a saw operatively connected thereto;

d) continue moving the carcass and head downstream; and e) moving the moveable end upward, by movement of the head, thereby adjusting the saw to a proper height to cut the connecting strip and remove the head from the carcass.

* * * * *

UNITED STATES PATENT AND TRADEMARK OFFICE
CERTIFICATE OF CORRECTION

PATENT NO.    : 6,776,701 B2
DATED         : August 17, 2004
INVENTOR(S)   : Frank D. Fryer It is certified that error appears in the above-identified patent and that said Letters Patent is hereby corrected as shown below:

<u>Title page,</u>
Item [57], ABSTRACT,
Line 5, insert -- end -- after "second"

<u>Column 5,</u>
Line 67, delete "1" and insert therefore -- 11 --

<u>Column 6,</u>
Line 23, insert -- an -- after "from"
Line 31, delete "fee" and insert therefore -- free --
Line 52, delete "arm" and insert therefore -- arms --
Line 54, delete "comprising" and insert therefore -- comprises --

Signed and Sealed this

Eighth Day of February, 2005

JON W. DUDAS
*Director of the United States Patent and Trademark Office*